(12) United States Patent
Toda

(10) Patent No.: US 9,039,023 B2
(45) Date of Patent: May 26, 2015

(54) OUTER TUBE FOR FRONT FORK

(75) Inventor: Tomoya Toda, Shizuoka (JP)

(73) Assignee: Showa Corporation, Saitama (JP)

( * ) Notice: Subject to any disclaimer, the term of this patent is extended or adjusted under 35 U.S.C. 154(b) by 308 days.

(21) Appl. No.: 13/430,467

(22) Filed: Mar. 26, 2012

(65) Prior Publication Data

US 2013/0075999 A1    Mar. 28, 2013

(30) Foreign Application Priority Data

Sep. 26, 2011   (JP) ................. 2011-209188

(51) Int. Cl.
| | |
|---|---|
| B62K 21/02 | (2006.01) |
| B62K 25/08 | (2006.01) |
| B62K 19/16 | (2006.01) |
| B62K 19/32 | (2006.01) |
| F16F 9/32 | (2006.01) |

(52) U.S. Cl.
CPC ............... B62K 19/16 (2013.01); B62K 21/02 (2013.01); B62K 25/08 (2013.01); B62K 19/32 (2013.01); F16F 9/3235 (2013.01)

(58) Field of Classification Search
CPC ......... B62K 21/02; B62K 21/18; B62K 25/08
USPC ............ 280/276, 277, 279, 280, 281.1, 304.3
See application file for complete search history.

(56) References Cited

U.S. PATENT DOCUMENTS

| | | | | |
|---|---|---|---|---|
| 4,964,625 | A * | 10/1990 | Kawamura .................... | 267/221 |
| 5,908,200 | A * | 6/1999 | Stewart ......................... | 280/276 |
| 6,244,609 | B1 | 6/2001 | Wilson | |
| 6,505,719 | B2 * | 1/2003 | Gonzalez et al. ........... | 188/319.2 |
| 7,201,391 | B2 * | 4/2007 | Takahashi et al. ............ | 280/276 |
| 7,281,722 | B2 * | 10/2007 | Fukuda et al. ......... | 280/124.104 |
| 7,425,009 | B2 * | 9/2008 | Namazue et al. ............. | 280/279 |
| 2001/0040078 | A1 * | 11/2001 | Gonzalez et al. ........... | 188/319.2 |
| 2004/0046354 | A1 * | 3/2004 | Turner et al. .................. | 280/276 |
| 2004/0207171 | A1 * | 10/2004 | Francis et al. ................ | 280/276 |
| 2005/0051993 | A1 * | 3/2005 | Ito et al. ........................ | 280/276 |
| 2006/0170185 | A1 * | 8/2006 | Takahashi et al. ............ | 280/276 |
| 2009/0189366 | A1 * | 7/2009 | Toda et al. .................... | 280/276 |
| 2009/0189367 | A1 | 7/2009 | Toda et al. | |
| 2010/0123297 | A1 * | 5/2010 | Dal Soggio ................... | 280/276 |
| 2011/0187076 | A1 * | 8/2011 | Gonzalez et al. ............. | 280/276 |
| 2013/0154233 | A1 * | 6/2013 | Amano et al. ................ | 280/276 |

FOREIGN PATENT DOCUMENTS

| | | |
|---|---|---|
| JP | 2005-299918 | 10/2005 |
| JP | 2007-218275 | 8/2007 |
| JP | 2009-180293 | 8/2009 |

* cited by examiner

*Primary Examiner* — Joseph Rocca
*Assistant Examiner* — Maurice Williams
(74) *Attorney, Agent, or Firm* — Keith Orum; Orum & Roth LLC

(57) ABSTRACT

In an outer tube for a front fork, a metal upper collar to which an upper vehicle body attaching bracket is connected is fitted and attached to an upper end portion of the plastic pipe, a metal sleeve is fitted and attached between an intermediate portion and a lower end portion of the plastic pipe, and the sleeve is provided with a lower collar to which a lower vehicle body attaching bracket is connected, and a seal case for inserting and supporting the inner tube.

6 Claims, 7 Drawing Sheets

OUTER TUBE FOR FRONT FORK

BACKGROUND OF THE INVENTION

1. Field of the Invention

The present invention relates to an outer tube for a front fork.

2. Description of the Related Art

As an outer tube for a front fork, as described in Japanese Unexamined Patent Publication No. 2009-180293 (patent document 1), there is an element structured such that a metal upper collar to which an upper vehicle body attaching bracket is connected is fitted and attached to an upper end portion of a fiber reinforced plastic (hereinafter, refer to as FRP) pipe, a metal lower collar to which a lower vehicle body attaching bracket is connected is fitted and attached to an intermediate portion of the FRP pipe, and a metal seal case for inserting and supporting an inner tube is fitted and attached to a lower end portion of the FRP pipe, for reinforcing the FRP pipe.

In this case, the upper collar and the seal case are brought into contact with an upper end surface and a lower end surface of the FRP pipe, and is adhered to the FRP pipe. On the other hand, the lower collar is adhered after being positioned to an appropriate position of the intermediate portion of the FRP pipe.

The following problems exist in the outer tube for the front fork in accordance with the related art.

(1) It is necessary to set the position of the lower collar and it takes a lot of effort, at a time of adhering the lower collar to the intermediate portion of the FRP pipe.

(2) In the case that the FRP pipe is used in the outer tube for the front fork of the vehicle, a load which acts in a vehicle body back and forth direction and a vehicle body right and left direction of the front fork generates a stress concentration in a contact portion with a lower end edge of the lower collar in the FRP pipe, and makes the FRP pipe disadvantageous regarding fatigue strength.

(3) In the case that the FRP pipe is used in the outer tube for the front fork of the vehicle, it is necessary to appropriately change a fiber direction of the FRP in each of laminated sheet-like raw materials or partly change the number of lamination, at a time of manufacturing the FRP pipe. This is done by laminating the sheet-like raw materials such as a one direction material, a cross material or the like of the FRP, in the case that it is intended to appropriately change a bending stiffness of the outer tube with respect to the vehicle body back and forth direction and the vehicle body right and left direction of the front fork in a pipe circumferential direction, which takes a lot of effort.

SUMMARY OF THE INVENTION

An object of the present invention is to improve a positioning characteristic of a lower collar with respect to a plastic pipe, in an outer tube for a front fork structured such that a lower collar to which a lower vehicle body attaching bracket is connected is provided in an intermediate portion of the plastic pipe.

Another object of the present invention is to improve a fatigue strength of the plastic pipe.

Still another object of the present invention is to easily change a bending stiffness of the outer tube in a circumferential direction of the plastic pipe.

In accordance with one embodiment of the present invention, there is provided an outer tube for a front fork constructed by a plastic pipe, wherein a metal upper collar to which an upper vehicle body attaching bracket is connected is fitted and attached to an upper end portion of the plastic pipe. A metal sleeve is fitted and attached between an intermediate portion and a lower end portion of the plastic pipe. The sleeve is provided with a lower collar to which a lower vehicle body attaching bracket is connected, and a seal case for inserting and supporting the inner tube.

In accordance with another embodiment of the present invention, the upper collar is provided with an inner peripheral upper step portion which is brought into contact with an upper end surface of the plastic pipe. The sleeve is provided with an inner peripheral lower step portion which is brought into contact with a lower end surface of the plastic pipe.

In accordance with another embodiment of the present invention, the upper collar and the sleeve are fitted and attached to the plastic pipe via an adhesive agent.

In accordance with another embodiment of the present invention, the portion in which the sleeve is sandwiched between the lower collar and the seal case is formed as a thin connecting portion which is thinner than the lower collar and the seal case.

In accordance with another embodiment of the present invention, an opening portion is formed in a notch manner in the portion in which the sleeve is sandwiched between the lower collar and the seal case.

In accordance with another embodiment of the present invention, the sleeve is structured such that an opening portion is formed in a notch manner in a side surface in a vehicle body right and left direction.

In accordance with another embodiment of the present invention, the plastic pipe is constructed by an FRP pipe.

In accordance with another embodiment of the present invention, a metal thin pipe is fitted to an inner periphery of the plastic pipe.

In accordance with another embodiment of the present invention, a lower end portion of the upper collar is formed as a taper surface which is thinner little by little toward a leading end.

In accordance with another embodiment of the present invention, an upper end portion of the sleeve is formed as a taper surface which is thinner little by little toward a leading end.

One embodiment of the present invention is an inverted type front fork in which an inner tube in an axle side is slidably inserted into an outer tube in a vehicle body side, wherein the outer tube for the front fork as described is used.

In accordance with the present embodiment, the following operations and effects can be achieved.

(a) In the outer tube for the front fork, the metal upper collar to which the upper vehicle body attaching bracket is connected is fitted and attached to the upper end portion of the plastic pipe, the metal sleeve is fitted and attached between the intermediate portion and the lower end portion of the plastic pipe, and the sleeve is provided with the lower collar to which the lower vehicle body attaching bracket is connected, and the seal case for inserting and supporting the inner tube.

The sleeve provided with the lower collar and the seal case is fitted and attached between the intermediate portion and the lower end portion of the plastic pipe. The sleeve is easily positioned with respect to the lower end portion of the plastic pipe. As a result, it is possible to easily position the lower collar provided in the sleeve with respect to the plastic pipe.

The seal case is connected to the lower collar to which the lower vehicle body attaching bracket is connected so as to construct the sleeve, and the sleeve is fitted and attached between the intermediate portion and the lower end portion of the plastic pipe. Accordingly, the lower collar does not have such a lower end edge as to come into contact with the plastic pipe, and a stress concentration caused by the contact with the lower end edge of the lower collar is not generated in the plastic pipe. A fatigue strength of the plastic pipe is improved.

(b) The upper collar is easily positioned with respect to the plastic pipe by the inner peripheral upper step portion which is brought into contact with the upper end surface of the plastic pipe.

The lower collar is easily positioned with respect to the plastic pipe by the inner peripheral lower step portion which is brought into contact with the lower end surface of the plastic pipe.

(c) The upper collar and the sleeve are fitted and attached to the plastic pipe via the adhesive agent. In accordance with this, it is possible to firmly integrate the upper collar and the plastic pipe. Further, it is possible to firmly integrate the sleeve and the plastic pipe.

(d) The portion in which the sleeve is sandwiched between the lower collar and the seal case is formed as the thin connecting portion which is thinner than the lower collar and the seal case. In accordance with this, it is possible to connect the lower collar and the seal case while forming the connecting portion which does not require strength in the thin sleeve so as to achieve a weight saving of a whole of the sleeve.

(e) The opening portion is formed in a notch manner in the portion in which the sleeve is sandwiched between the lower collar and the seal case. The stiffness of the portion which is provided with the opening portion in the sleeve is lowered. When the sleeve is fitted and attached to the plastic pipe which constructs the outer tube, the bending stiffness in the direction in which the opening portion of the sleeve is provided in the pipe circumferential direction of the outer tube is lowered, and it is possible to easily change the bending stiffness of the outer tube in the circumferential direction of the plastic pipe.

(f) When the sleeve fitted and attached to the plastic pipe which constructs the outer tube is structured such that the opening portion is formed in a notch manner in the side surface in the vehicle body right and left direction, the bending stiffness of the outer tube is lowered in the vehicle body right and left direction. In this outer tube, it is possible to secure a firm feeling with respect to the load in the vehicle body back and forth direction which acts on the front fork at a time of braking, and achieve an improvement of a shock absorption with respect to the load in the vehicle width direction which acts on the front fork at a time of cornering. This is accomplished by making the bending stiffness in the vehicle body back and forth direction of the lower portion of the vehicle body attaching portion large so as to make it hard to be deformed, and making the bending stiffness in the vehicle body right and left direction small so as to make it easy to be deformed.

(g) Since the plastic pipe is made of the FRP such as a carbon fiber reinforced plastic (CFRP), it is possible to make the outer tube high in strength while saving weight.

(h) Since the metal thin pipe is fitted to the inner periphery of the plastic pipe, it is possible to secure the circularity of the plastic pipe so as to improve sliding performance of the inner tube.

(i) In the outer tube of the inverted type front fork, it is possible to achieve the items (a) to (h) mentioned above.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 7A:
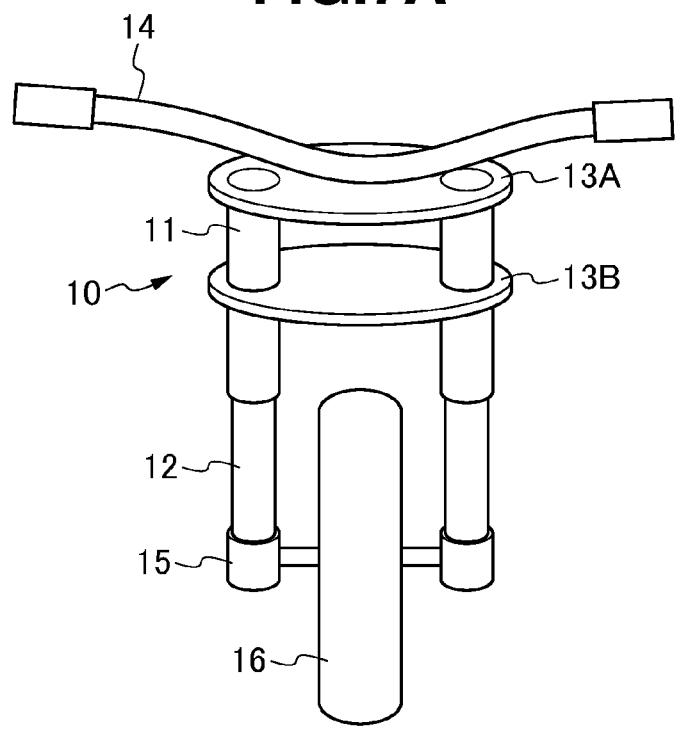
FIGS. 7A and 7B are schematic views showing a front fork.
Figure 7B:
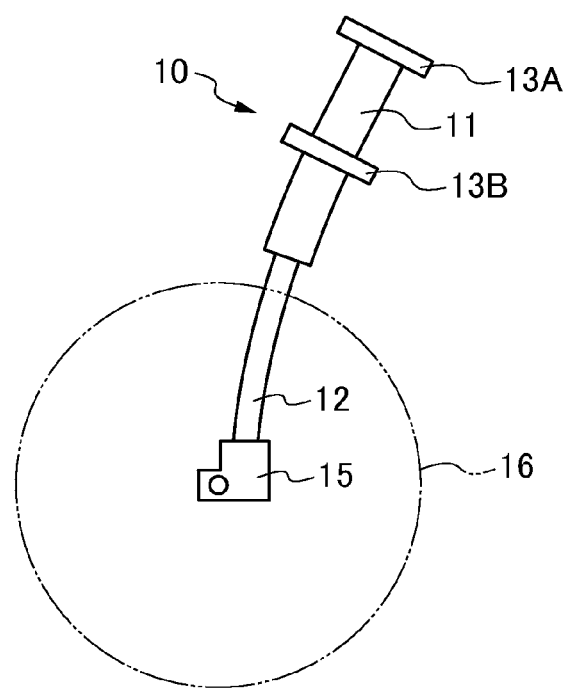

Right and left inverted type front forks 10 are structured, as shown in FIGS. 7A and 7B, such that an axle side inner tube 12 is slidably inserted into a vehicle body side outer tube 11, and have a built-in damping mechanism. The right and left outer tubes 11 are connected by an upper vehicle body attaching bracket 13A and a lower vehicle body attaching bracket 13B. A handle rotating shaft (not shown) connecting the upper vehicle body attaching bracket 13A and the lower vehicle body attaching bracket 13B is pivoted to a head pipe of a vehicle body frame, and a bar handle 14 is fixed to the upper vehicle body attaching bracket 13A. Axle brackets 15 provided in lower end portions of the right and left inner tubes 12 pivot an axle of a wheel 16.

Figure 1:
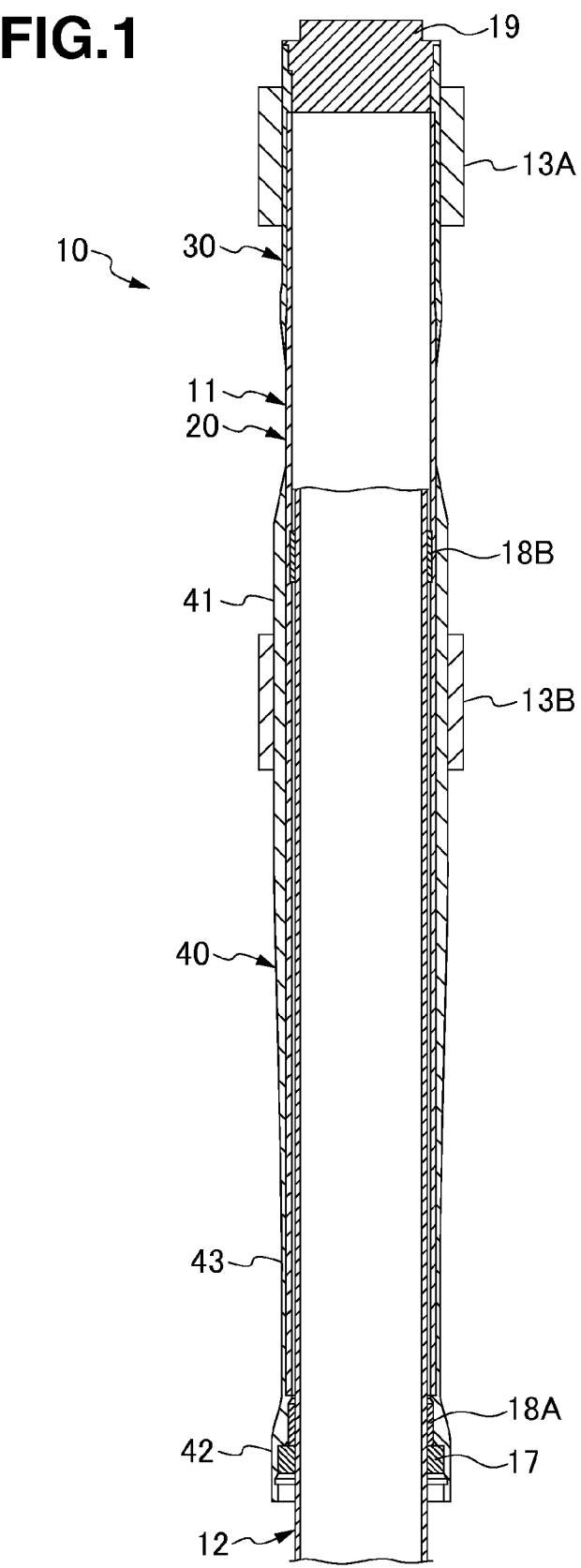
FIG. 1 is a cross sectional view showing a main part of a front fork.
Figure 2:
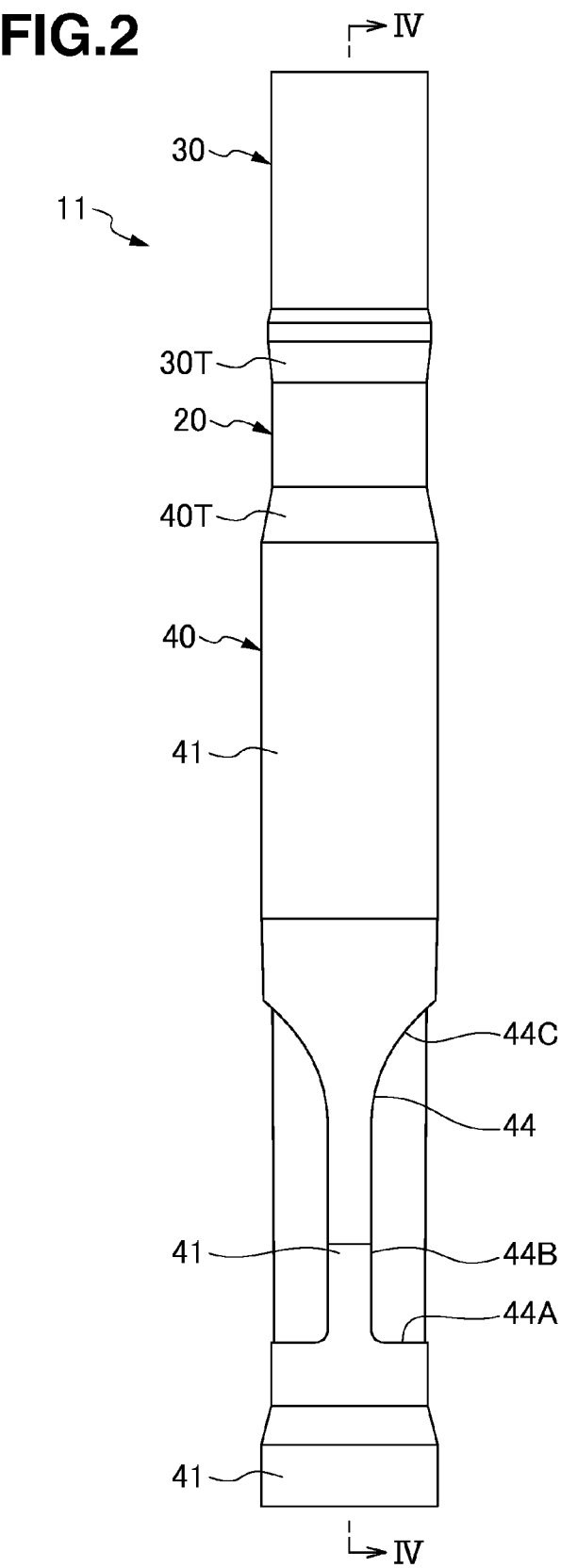
FIG. 2 is a front elevational view showing an outer tube.
Figure 3:
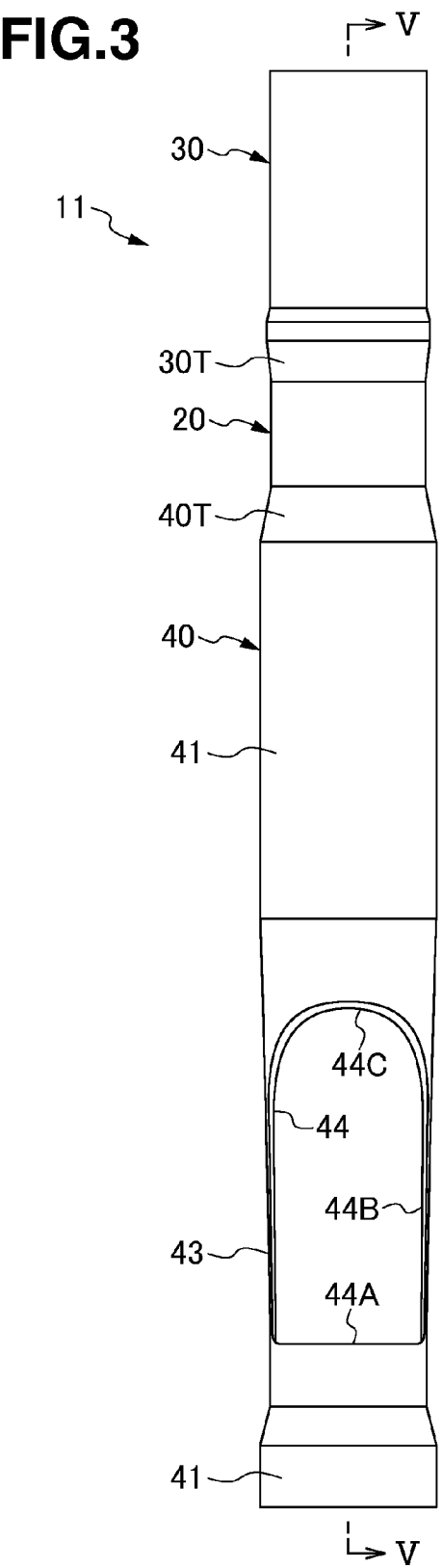
FIG. 3 is a side elevational view showing the outer tube.
Figure 4:
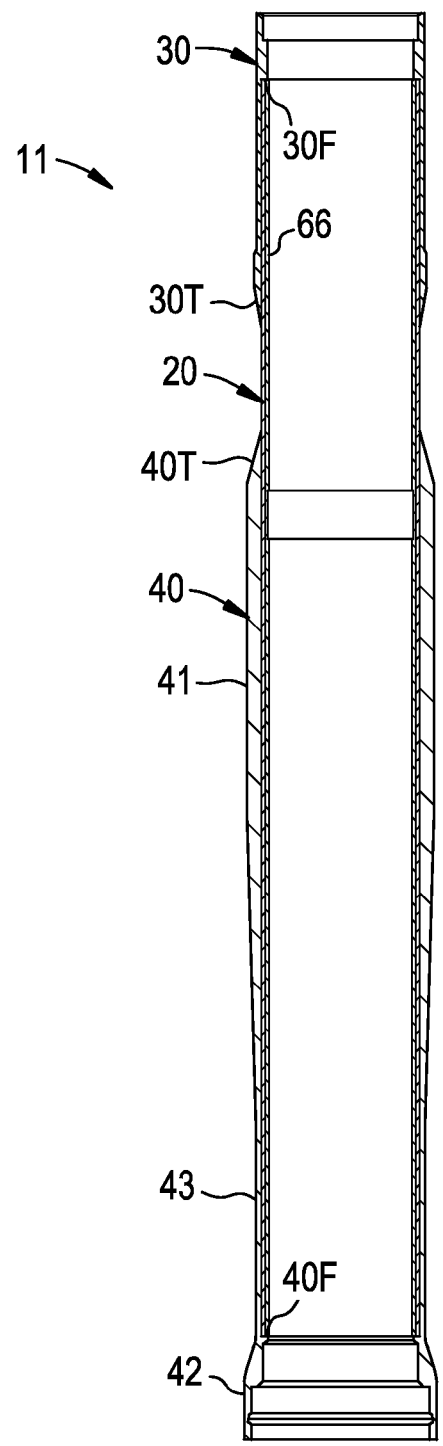
FIG. 4 is a cross sectional view along a line IV-IV in FIG. 2.
Figure 5:
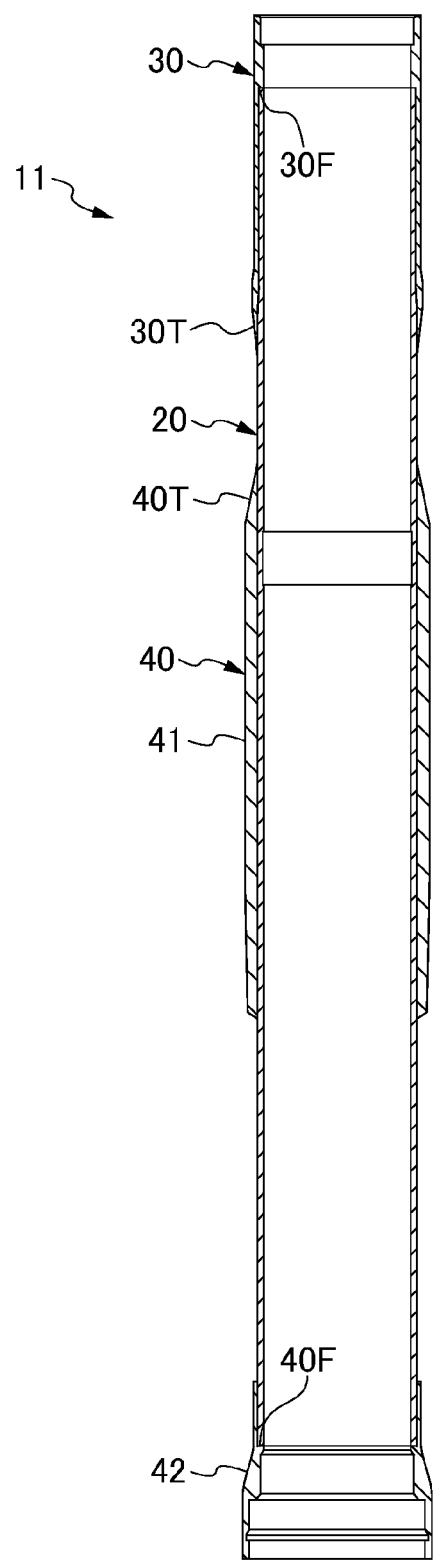
FIG. 5 is a cross sectional view along a line V-V in FIG. 3.

The front fork 10 is structured, as shown in FIG. 1, such that an oil seal 17 is provided in a lower end opening portion of the outer tube 11, and the inner tube 12 is inserted into the outer tube 11 through the oil seal 17. The outer tube 11 and the inner tube 12 are slidable with each other via a bush 18A which is provided in an inner peripheral portion of a lower end of the outer tube 11, and a bush 18B which is provided in an outer peripheral portion of an upper end of the inner tube 12. In this case, a cap 19 is threadably attached to an opening portion of an upper end of the outer tube 11.

A damping mechanism embedded in the front fork 10 is not illustrated; however, it can be constructed by inserting a piston rod which is supported to one of the outer tube 11 and the inner tube 12 into a working fluid chamber within a damper cylinder which is provided in the other of the outer tube 11 and the inner tube 12, and providing a damping force generating apparatus in a leading end piston of the piston rod. Alternatively, it can be constructed by inserting the piston rod which is supported to the outer tube 11 into the working fluid chamber within the inner tube 12, and providing the damping force generating apparatus in the leading end piston of the piston rod.

The front fork 10 is structured such that the outer tube 11 is constructed by a plastic pipe such as an FRP, and the inner tube 12 is constructed by a metal pipe such as of aluminum or iron, or the plastic pipe such as the FRP. A description will be given in detail below of a structure of the outer tube 11.

The outer tube 11 has a plastic pipe such as the FRP, a cylindrical CFRP pipe 20 in the present embodiment, as shown in FIGS. 2 to 5. The CFRP pipe 20 can be manufactured, for example, in accordance with a sheet winding method, and is formed in a tubular shape by winding the one direction material of the CFRP or the sheet-like raw material such as the cross material to a core rod in a multiple manner.

The outer tube 11 is structured such that a metal upper collar 30 to which the upper vehicle body attaching bracket 13A is connected is fitted and attached to an upper end portion of the CFRP pipe 20. As a constructing metal of the upper collar 30, it is possible to employ aluminum, titanium, magnesium, iron or the like.

The upper collar 30 is provided with an inner peripheral upper step portion 30F which is brought into contact with an upper end surface of the CFRP pipe 20 in an end in a fitting and attaching direction to the CFRP pipe 20. The upper collar 30 is fitted and attached to an outer periphery of the CFRP pipe 20 from an upper end side thereof via an adhesive agent so as to be integrally connected. A lower end outer peripheral surface of the upper collar 30 is formed as a taper surface 30T in which a lower end portion of the upper collar 30 is made thinner little by little toward a leading end, in order to reduce a stress which the lower end portion of the upper collar 30 applies to the CFRP pipe 20. In this case, a cap 19 is threadably attached to an inner peripheral portion of the upper end of the upper collar 30.

The outer tube 11 is structured such that a metal sleeve 40 is fitted and attached between an intermediate portion and a lower end portion of the CFRP pipe 20. The metal sleeve 40 is provided with a lower collar 41 to which the lower vehicle body attaching bracket 13B is connected, and a seal case 42 for inserting and supporting the inner tube 12. The oil seal 17 and the bush 18A are accommodated in an inner periphery of the seal case 42. As a constructing metal of the sleeve 40, it is possible to employ aluminum, titanium, magnesium, iron or the like.

The sleeve 40 is provided with an inner periphery lower step portion 40F which is brought into contact with the lower end surface of the CFRP pipe 20 in the end in the fitting and attaching direction to the CFRP pipe 20. The sleeve 40 is fitted and attached to the outer periphery of the CFRP pipe 20 from the lower end side thereof via an adhesive agent so as to be integrally connected. An outer peripheral surface of an upper end of the sleeve 40 is formed as a taper surface 40T in which an upper end portion of the sleeve 40 is made thinner little by little toward a leading end, in order to reduce a stress which the upper end portion of the sleeve 40 applies to the CFRP pipe 20.

Figure 6:
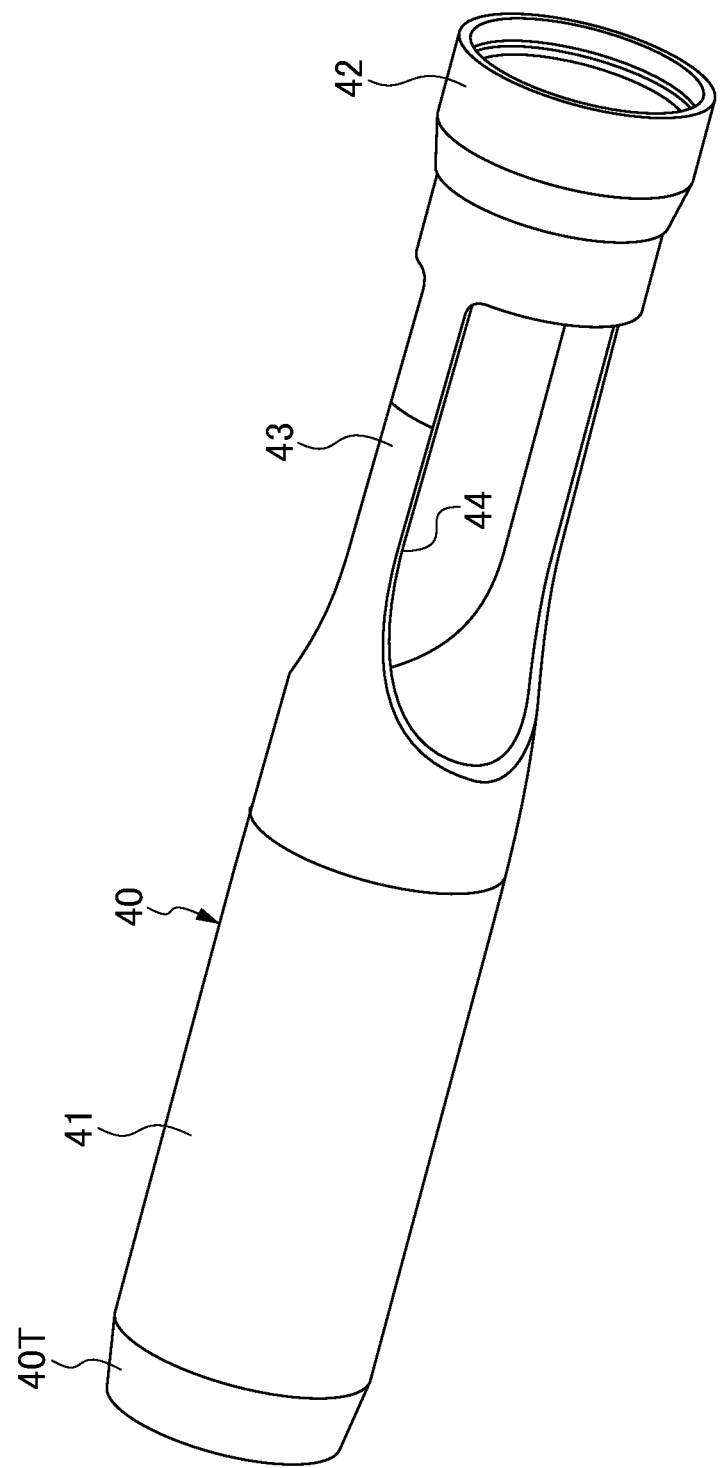
FIG. 6 is a perspective view showing a sleeve.

The sleeve 40 is structured, as shown in FIG. 6, such that a portion pinched by the lower collar 41 and the seal case 42 is formed as a tubular thin connecting portion 43 which is thinner than the lower collar 41 and the seal case 42.

The sleeve 40 forms in a notch manner a window-like opening portion 44 in a portion which is sandwiched between the lower collar 41 and the seal case 42, the thin connecting portion 43 mentioned above in the present embodiment. In the present embodiment, the opening portion 44 is formed in a notch manner in both side surfaces in the vehicle body right and left direction in the circumferential direction of the sleeve 40, thereby lowering a stiffness of the sleeve 40 in the circumferential direction and further lowering a bending stiffness, in the circumferential direction, of the outer tube 11 which is provided with the sleeve 40 in the CFRP pipe 20. The opening portion 44 is formed by being surrounded by four sides including a lower side 44A which is orthogonal to a center axis of the sleeve 40, both side vertical sides 44B which extend in a direction along the center axis of the sleeve 40 from both end portions of the lower side 44A, and a circular arc shaped upper side 44C which connects upper end portions of both the side vertical sides 44B, and is formed in a notch manner so as to arrange the lower side 44A in a side of the seal case 42, and arrange the upper side 44C in a side of the lower collar 41.

In the outer tube 11, it is possible to fit a metal thin pipe 66 made of aluminum, iron or the like for securing a circularity of the CFRP pipe 20 and improving a sliding performance of the inner tube 12 to an inner periphery of the CFRP pipe 20. The metal thin pipe fitted to the CFRP pipe 20 comes into contact with the inner peripheral upper step portion 30F of the upper collar 30 and the inner peripheral lower step portion 40F of the sleeve 40 so as to be prevented from coming off.

In accordance with the present invention, the following operation and effects can be achieved.

(a) In the outer tube 11 for the front fork, the metal upper collar 30 to which the upper vehicle body attaching bracket 13A is connected is fitted and attached to the upper end portion of the CFRP pipe 20. The metal sleeve 40 is fitted and attached between the intermediate portion and the lower end portion of the CFRP pipe 20, and the sleeve 40 is provided with the lower collar 41 to which the lower vehicle body attaching bracket 13B is connected, and the seal case 42 for inserting and supporting the inner tube 12.

The sleeve 40 provided with the lower collar 41 and the seal case 42 is fitted and attached between the intermediate portion and the lower end portion of the CFRP pipe 20. The sleeve 40 is easily positioned with respect to the lower end portion of the CFRP pipe 20. As a result, it is possible to easily position the lower collar 41 provided in the sleeve 40 with respect to the CFRP pipe 20.

The seal case 42 is connected to the lower collar 41 to which the lower vehicle body attaching bracket 13B is connected so as to construct the sleeve 40, and the sleeve 40 is fitted and attached between the intermediate portion and the lower end portion of the CFRP pipe 20. Accordingly, the lower collar 41 does not have such a lower end edge as to come into contact with the CFRP pipe 20, and a stress concentration caused by the contact with the lower end edge of the lower collar 41 is not generated in the CFRP pipe 20. A fatigue strength of the CFRP pipe 20 is improved.

(b) The upper collar 30 is easily positioned with respect to the CFRP pipe 20 by the inner peripheral upper step portion 30F which is brought into contact with the upper end surface of the CFRP pipe 20.

The lower collar 41 is easily positioned with respect to the CFRP pipe 20 by the inner peripheral lower step portion 40F which is brought into contact with the lower end surface of the CFRP pipe 20.

(c) The upper collar 30 and the sleeve 40 are fitted and attached to the CFRP pipe 20 via the adhesive agent. In accordance with this, it is possible to firmly integrate the upper collar 30 and the CFRP pipe 20. Further, it is possible to firmly integrate the sleeve 40 and the CFRP pipe 20.

(d) The portion in which the sleeve 40 is sandwiched between the lower collar 41 and the seal case 42 is formed as the thin connecting portion 43 which is thinner than the lower collar 41 and the seal case 42. In accordance with this, it is possible to connect the lower collar 41 and the seal case 42 while forming the connecting portion 43 which does not require a strength in the sleeve 40 thin so as to achieve a weight saving of a whole of the sleeve 40.

(e) The opening portion 44 is formed in a notch manner in the portion in which the sleeve 40 is sandwiched between the lower collar 41 and the seal case 42. The stiffness of the portion which is provided with the opening portion 44 in the sleeve 40 is lowered. When the sleeve 40 is fitted and attached to the CFRP pipe 20 which constructs the outer tube 11, the bending stiffness in the direction in which the opening portion 44 of the sleeve 40 is provided in the pipe circumferential direction of the outer tube 11 is lowered, and it is possible to easily change the bending stiffness of the outer tube 11 in the circumferential direction of the CFRP pipe 20.

(f) When the sleeve 40 fitted and attached to the CFRP pipe 20 which constructs the outer tube 11 is structured such that the opening portion 44 is formed in a notch manner in the side surface in the vehicle body right and left direction, the bending stiffness of the outer tube 11 is lowered in the vehicle body right and left direction. In this outer tube 11, it is possible to secure a firm feeling with respect to the load in the vehicle body back and forth direction which acts on the front fork at a time of braking, and achieve an improvement of a shock absorption with respect to the load in the vehicle width direction which acts on the front fork at a time of cornering, by making the bending stiffness in the vehicle body back and forth direction of the lower portion of the vehicle body attaching portion large so as to make it hard to be deformed, and making the bending stiffness in the vehicle body right and left direction small so as to make it easy to be deformed.

(g) Since the CFRP pipe 20 is made of the FRP such as a carbon fiber reinforced plastic (CFRP), it is possible to make the outer tube 11 high in strength while saving weight.

(h) Since the metal thin pipe is fitted to the inner periphery of the CFRP pipe 20, it is possible to secure the circularity of the CFRP pipe 20 so as to improve sliding performance of the inner tube 12.

(i) In the outer tube 11 of the inverted type front fork 10, it is possible to achieve the items (a) to (h) mentioned above.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the opening portion formed in a notch manner in the portion which is sandwiched between the lower collar 41 of the sleeve 40 and the seal case 42 is set at an appropriate position in the circumferential direction of the sleeve 40 in accordance with a change mode in the circumferential direction of the plastic pipe 20 of the stiffness of the sleeve 40, further the bending stiffness of the outer tube 11 structured such that the sleeve 40 is provided in the plastic pipe 20, for example, by being provided in the side surface in the vehicle body back and forth direction in the circumferential direction of the sleeve 40.

In accordance with the present invention, there is provided an outer tube for a front fork constructed by a plastic pipe, wherein a metal upper collar to which an upper vehicle body attaching bracket is connected is fitted and attached to an upper end portion of the plastic pipe. A metal sleeve is fitted and attached between an intermediate portion and a lower end portion of the plastic pipe. The sleeve is provided with a lower collar to which a lower vehicle body attaching bracket is connected, and a seal case for inserting and supporting the inner tube. Accordingly, it is possible to improve a positioning characteristic of a lower collar with respect to a plastic pipe, in an outer tube for a front fork structured such that a lower collar to which a lower vehicle body attaching bracket is connected is provided in an intermediate portion of the plastic pipe.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. Right and left outer tubes for a front fork each tube having a plastic pipe,
    wherein a metal upper collar is fitted and attached to an upper end portion of the plastic pipe,
    a metal sleeve is fitted and attached between an intermediate portion and lower end portion of the plastic pipe, and the sleeve is provided with a lower collar and a seal case for inserting and supporting an inner tube,
    the right and left outer tubes are connected by an upper vehicle body attaching bracket and a lower vehicle body attaching bracket,
    the upper vehicle body attaching bracket is attached to the metal upper collar of the right outer tube and the metal upper collar of the left outer tube,
    the lower vehicle body attaching bracket is attached to the lower collar of the metal sleeve of the right outer tube and the lower collar of the metal sleeve of the left outer tube, and
    a portion of the sleeve which is between the lower collar and seal case is formed as a thin connecting portion which is thinner than the lower collar and the seal case.

2. Right and left outer tubes for a front fork each tube having a plastic pipe,
    wherein a metal upper collar is fitted and attached to an upper end portion of the plastic pipe,
    a metal sleeve is fitted and attached between an intermediate portion and a lower end portion of the plastic pipe, and the sleeve is provided with a lower collar and a seal case for inserting and supporting an inner tube,
    the right and left outer tubes are connected by an upper vehicle body attaching bracket and a lower vehicle body attaching bracket,
    the upper vehicle body attaching bracket is attached to the metal upper collar of the right outer tube and the metal upper collar of the left outer tube,
    the lower vehicle body attaching bracket is attached to the lower collar of the metal sleeve of the right outer tube and the lower collar of the metal sleeve of the left outer tube,
    the upper collar is provided with an inner peripheral upper step portion which is brought into contact with an upper end surface of the plastic pipe,
    the sleeve is provided with an inner peripheral lower step portion which is brought into contact with a lower end surface of the plastic pipe, and
    a portion of the sleeve which is between the lower collar and seal case is formed as a thin connecting portion which is thinner than the lower collar and the seal case.

3. Right and left outer tubes for a front fork each tube having a plastic pipe,
    wherein a metal upper collar is fitted and attached to an upper end portion of the plastic pipe,
    a metal sleeve is fitted and attached between an intermediate portion and a lower end portion of the plastic pipe, and the sleeve is provided with a lower collar and a seal case for inserting and supporting an inner tube,
    the right and left outer tubes are connected by an upper vehicle body attaching bracket and a lower vehicle body attaching bracket,
    the upper vehicle body attaching bracket is attached to the metal upper collar of the right outer tube and the metal upper collar of the left outer tube,
    the lower vehicle body attaching bracket is attached to the lower collar of the metal sleeve of the right outer tube and the lower collar of the metal sleeve of the left outer tube, and
    an opening portion is formed in a notch manner in a portion of the sleeve which is between the lower collar and seal case.

4. The outer tube for a front fork according to claim 3, wherein the sleeve is structured such that the opening portion is formed in a notch manner in a side surface in a vehicle body right and left direction.

5. Right and left outer tubes for a front fork each tube having a plastic pipe,
- wherein a metal upper collar is fitted and attached to an upper end portion of the plastic pipe,
- a metal sleeve is fitted and attached between an intermediate portion and a lower end portion of the plastic pipe, and the sleeve is provided with a lower collar and a seal case for inserting and supporting an inner tube,
- the right and left outer tubes are connected by an upper vehicle body attaching bracket and a lower vehicle body attaching bracket,
- the upper vehicle body attaching bracket is attached to the metal upper collar of the right outer tube and the metal upper collar of the left outer tube,
- the lower vehicle body attaching bracket is attached to the lower collar of the metal sleeve of the right outer tube and the lower collar of the metal sleeve of the left outer tube,
- the upper collar is provided with an inner peripheral upper step portion which is brought into contact with an upper end surface of the plastic pipe,
- the sleeve is provided with an inner peripheral lower step portion which is brought into contact with a lower end surface of the plastic pipe, and
- an opening portion is formed in a notch manner in a portion of the sleeve which is between the lower collar and seal case.

6. The outer tube for a front fork according to claim 5, wherein the sleeve is structured such that the opening portion is formed in a notch manner in a side surface in a vehicle body right and left direction.

* * * * *